June 4, 1935.  R. ZAHNER  2,003,796

MELTING POT, PARTICULARLY FOR STEREOTYPE CASTING MACHINES

Filed April 10, 1933

Inventor:
Robert Zahner
By: C. C. Powell
Atty.

Patented June 4, 1935

2,003,796

UNITED STATES PATENT OFFICE 2,003,796

MELTING POT, PARTICULARLY FOR STEREOTYPE CASTING MACHINES

Robert Zahner, Bern, Switzerland

Application April 10, 1933, Serial No. 665,264
In Germany April 14, 1932

1 Claim. (Cl. 22—2)

In the melting pot of a casting machine for stereotype plates, or the like, of the kind in which the mold, for the purpose of casting, is adjoined to an opening provided near the bottom of the pot and controlled by a valve or cock, it is known to strengthen the outlet by a steel plate screwed on to, or cast in, the wall of the pot, so that, in closing the valve or cock, the cast plate is cut off from the contents of the pot against a hard metal edge. Such a screwed-on plate does not sufficiently prevent the wall of the pot from breaking near the outlet, while the cast-in plate has the great drawback that, when it becomes defective, it cannot simply be replaced by a new plate, but the entire melting pot becomes useless and must be replaced. Moreover, when casting-in the plate, both this plate and the wall of the pot are badly influenced.

According to my invention these drawbacks are overcome by providing the steel plate with lateral flanges having bearing surfaces whereby the plate may be readily shrunk on to corresponding surfaces provided on both sides of the pot mouth and thus hold the wall of the pot together at the part in which the valve or cock is seated.

By a steel plate combined with the pot in this way fracture of the pot near the mouth is avoided. Furthermore, when a plate has become defective it can be cut off and conveniently replaced by a new plate.

Figure 1:
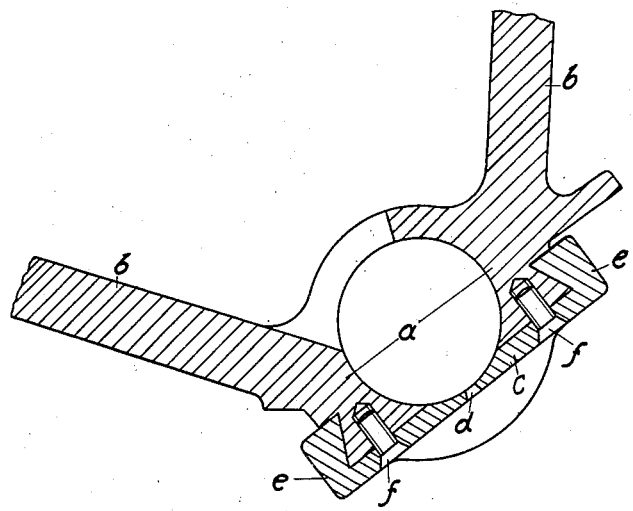
Figure 2:
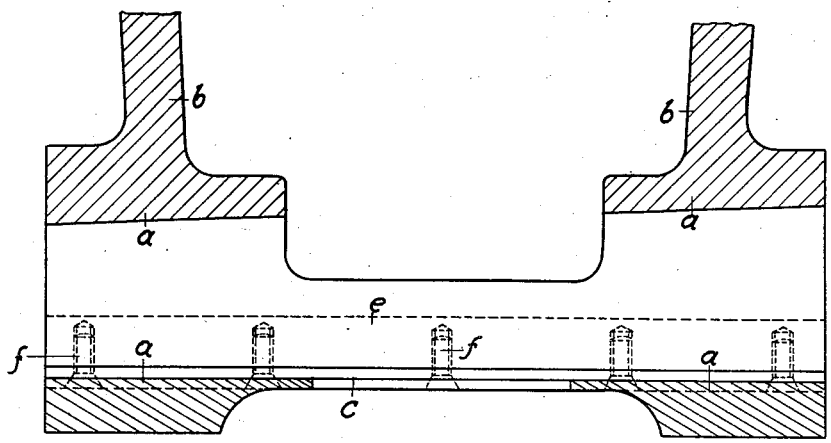

In the drawing a pot outlet constructed in accordance with the present invention is shown by example, Fig. 1 being a cross section through the bearing in the pot in which the valve or cock is seated, and Fig. 2 a longitudinal section of the same.

The valve or cock bearing $a$ is formed by the wall $b$ at the lowest part of the melting pot. On the outside of the wall the steel plate $c$ is attached, in which the outlet opening $d$ is provided.

According to the invention this steel plate is formed with flanges $e$ on each side, which flanges are undercut to provide bearing surfaces which come into engagement with corresponding surfaces on the outside of the valve or cock bearing. In order to provide a tight seal between the mouth of the melting pot and the steel plate $c$, and also to avoid fracture of the edges at the outlet opening, said plate is shrunk on in hot condition. It is afterwards secured by screws $f$ in order to prevent any lateral displacement that might otherwise occur due to the extreme changes of temperature to which the walls of the melting pot are subjected.

What I claim and desire to secure by Letters Patent of the United States is:—

In a machine for casting stereotype plates or the like, a melting pot having an outlet opening, a valve for controlling the flow of molten metal through said opening, a steel plate applied to the outside of said opening, exterior bearing surfaces provided on each side of said opening, corresponding bearing flanges provided on the longitudinal edges of said plate and arranged to embrace said exterior bearing surfaces, so that said plate may be readily shrunk to said melting pot to thereby avoid fracture of the edges of said opening.

ROBERT ZAHNER.